UNITED STATES PATENT OFFICE.

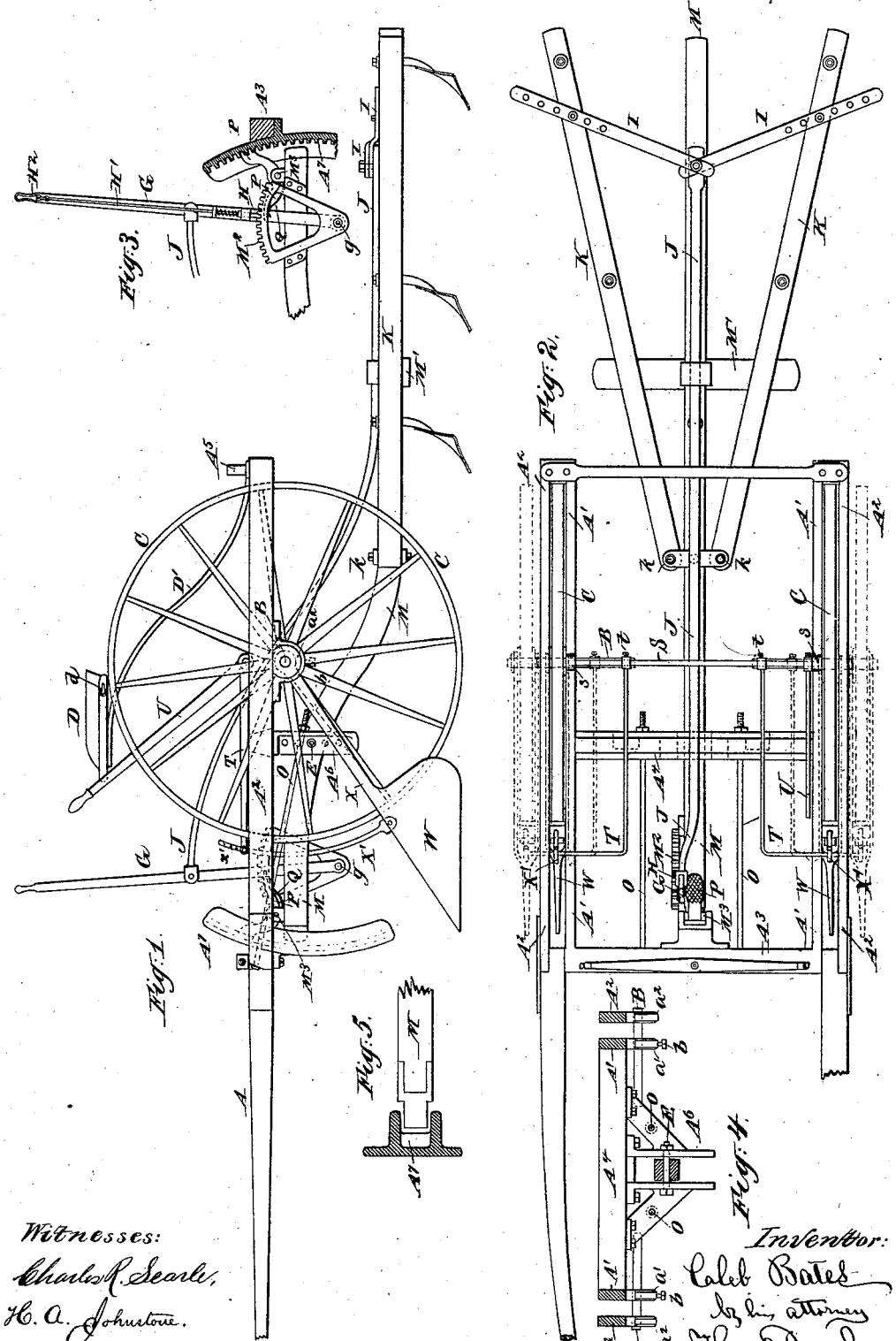

CALEB BATES, OF KINGSTON, MASSACHUSETTS.

SULKY-CULTIVATOR.

SPECIFICATION forming part of Letters Patent No. 365,458, dated June 28, 1887.

Application filed March 19, 1887. Serial No. 231,568. (No model.)

*To all whom it may concern:*

Be it known that I, CALEB BATES, of Kingston, in the county of Plymouth and State of Massachusetts, have invented a certain new and Improved Sulky-Cultivator, of which the following is a specification.

My improved cultivator is drawn by one horse, has its axle divided, giving a short length for each wheel, and is adapted for shifting the axles and wheels inward and outward to accommodate radical differences in the widths of rows. I provide for temporarily widening and narrowing the cultivator proper while running.

There are many situations in freshly or only partially broken land where it is required to operate among rocks, stumps, and other impediments, and in the same and in all situations there is a liability of the rows to vary considerably in their width apart at different points. This last can be avoided by extreme care in the marking and planting. My machine avoids the necessity for such extreme care. I can lift the cultivator proper so that its teeth will be entirely out of the ground and lower it again without requiring the use of the hands. I can by a convenient adjustment vary the depth to which the cultivator-teeth act without interfering with the other adjustments. I make the sulky-frame with two parallel longitudinal beams on each side, with sufficient space between them for a wheel to run. In shifting the width of the spaces between the wheels I can mount the wheels in these pockets in the frame, or can mount them outside of the outer frame, as circumstances shall require. I provide guards to diminish the chances of treading parts of the plants into the ground by the action of the wheels.

The following is a description of what I consider the best means of carrying out the invention.

The accompanying drawings form a part of this specification.

Figure 1 is a general side elevation. Fig. 2 is a plan view with the seat removed. Fig. 3 is a partial section and elevation of a portion detached. Fig. 4 is a cross-section through the machine with certain portions removed. Fig. 5 is a partial plan and horizontal section on a larger scale.

Similar letters of reference indicate corresponding parts in all the figures where they occur.

A' A' are the interior longitudinal beams or frames. $A^2 A^2$ are the corresponding exterior frames. $A^3$ is the front cross-brace, and $A^4$ a stout middle cross-brace. All these parts, as also the thills A, may be of hard wood. A cross-brace, $A^5$, at the extreme rear of the frame is preferably of wrought-iron or steel, and arched upward.

On the under side of the frames A' and $A^2$ are firmly bolted bearing-blocks $a' a^2$, of cast-iron or other suitable material, adapted to give a firm support to short axles B B. On the latter turn the bearing-wheels C C. When I wish the wheels to traverse wide, I shift the axles B to their extreme outermost position, holding them firmly by the pinching screws $b$, tapped through the bearing-blocks, mount the wheels on the projecting end, and secure them by linchpins or any other ordinary means. When, on the contrary, I wish the wheels to traverse narrowly, I disconnect the wheels, remove the axles B entirely, introduce the wheels in the sufficient space left on each side between the frame A' and the frame $A^2$, and reinsert the axles. The latter may for this use be adjusted inward nearly to the extreme possible position to reduce the extent to which the ends shall project idly beyond the frames. Now, the pinching-screws $b$ being again tightened, all is ready for use as before, except that the wheels traverse narrower, and the machine is adapted for permanently narrower breadths—the rows of plants nearer together.

D is the driver's seat. It is mounted on springs D', which are fixed to the frames A' or $A^2$ at the rear. The location of this seat is forward of the axles, and with the ordinary disposition of the body and limbs a considerable portion of the weight of the driver comes on the back of the horse. This lessens the pressure of the wheels on the roots of the growing plants.

The cross-brace $A^4$ carries a stout forked bracket, $A^6$, extending downward, as shown, and provided with a series of horizontal holes, into any one of which may be shifted the transverse pin E, which serves as a draft-point by which the cultivator is hauled and a fulcrum on which it is lifted. Tie-rods O extend from A³ through holes in the oblique lateral braces at the sides of A⁶, and are firmly attached thereto by nuts. They can be riveted, if preferred; but nuts give facility for adjustment, which is sometimes important.

M is a longitudinal lever, of hard wood or other suitable material, which performs important functions.

K K are divergent frames hinged together and to the lever M at k. Their rear ends are free, and may, on the contrary, be drawn together close to M or be held at the greatest distance from it which will ever be required in cultivating. These side frames carry each some of the cultivator-teeth. Other teeth are or may be carried on the lever M.

M' is a sufficiently stout cross-bar, of wood or iron, fastened to the under side of M and extending outward, so as to aid in supporting the side frames, K, and their teeth when they are lifted by the lever M, as will appear farther on. The degree of divergence of the side frames, K K, from each other and from the central lever, M, is controlled by a pair of toggle-links, I I, each pivoted at its inner end to a longitudinally-moving bar, J, which is controlled by the attendant. The extent to which the frames K K diverge with any given position of the bar J depends on which of the several holes in each link I receives the proper pin on the upper side of its corresponding frame K. There are a series of these holes, allowing the standard width to be correspondingly varied. When this has been adjusted and the machine started, there is a provision for temporarily widening and narrowing the cultivator by moving the bar J longitudinally.

G is a hand-lever within convenient reach of the driver, pivoted at g on an arm extended downward from the forward portion of the lever M. About half-way up on this lever is pivoted the rod J. The driver controls the action of the toggles I at will by moving the lever G forward or backward. Pushing the lever G forward contracts the width. Hauling it strongly backward increases the width of the cultivator.

On the forward end of the lever M, contiguous to the path traversed thereon by the vibrations of this lever G, is a toothed segment, M², struck from the center g. There is on the side of the lever G a spring-dog, H, (see Fig. 3,) mounted in housings carried on G, and having a link, H', leading to a light bell-crank lever, H², adjacent to the side of G. The attendant can, by grasping both, raise the dog H, and then he can shift in either direction the lever G and widen and narrow the cultivator at will. Whenever he chooses to hold it for a long or short period in any given position, it is only necessary to hold the lever G and liberate H², so that the spring-dog H may engage between the teeth of the segment M². There is a toothed rack, A⁷, extending upward and downward on the back face of the front cross-brace, A³. The portion of the lever M forward of the center E is of sufficient length and so loaded as to partially balance the cultivator. The operator can, by pressing downward with his weight on the front portion, lift the rear portion of M and its attachments. There are conditions—as in turning the ends—when it is desired to hold the cultivator thus out of the ground for a considerable period. To allow this the parts may be dogged with the cultivator supported.

P is a foot-lever mounted in a knuckle, M³, on the upper side of the forward end of M. It is subject to the force of the spring Q, which lifts its rear end. Its forward end is toothed and adapted to engage in the curved rack A⁷.

To hold the cultivator elevated, the attendant presses downward with his foot on the knuckle M³ and also on the rear end of the lever P. This disengages the teeth from the rack A⁷ and depresses the forward end of M, thus raising the rear end of M, and with it the entire cultivator proper, until the teeth of the cultivator are out of the ground. If it is desired that it shall remain so, the attendant shifts his foot a little, so as to liberate P while still pressing down on the knuckle M³. This allows the teeth to hold in the new position farther down on the rack A⁷ and to hold the cultivator elevated.

To lower the cultivator again into action, the attendant again presses down and disengages the teeth of the lever P from A⁷. Then holding his foot in that position, but relaxing its force, he allows the front end of M to rise and the cultivator to sink. He ultimately removes his foot and allows the dog to take hold again in its original high position, and all is ready for work, as before.

The shifting of the center pin, E, upward and downward in the series of holes in the fulcrum-bracket A⁶ varies the point of draft, and consequently the depth to which the teeth of the cultivator will act in the earth without interfering appreciably with the action of the other mechanism. Such change produces no effect on the action of the lever G and the rod J and its attachments for widening and narrowing. It involves only a corresponding readjustment of the teeth in a corresponding lower or higher position in the rack A⁷ to adapt the raising and lowering of the cultivator to the new conditions. The curvature of the rack A⁷ should be concentric to the middle or ordinary position of the pin E. When the pin is above or below that level, the curvature of the rack will not coincide exactly with the motion of the forward end of M, but no difficulty will be involved.

My machine is adapted for cultivating corn, potatoes, and other ordinary crops. The whole, including the draft-animal, is intended to work within the space between two contiguous rows. The wheels may, when the rows are very close, be shifted to their outermost position, so as to go outside of the plants; but ordinarily the wheels will also be within or between the rows. Thus conditioned, the corn, sugar-cane, or other plants may be of any height.

It is important to be able to run the wheels close to the plants without treading upon the leaves.

W are light sheet-iron scrapers or wheel-guards, analogous in form to plowshares, mounted on arms X, which hang on the axle B. Their function is to delicately lift the leaves of tobacco or other plants and to allow the wheels to roll harmlessly by.

To each pair of arms X is attached a curved rod, X', extending upward to a point a little above the frames A' A². The upper end is provided with a series of holes, x'.

S is a light shaft extending across the machine and mounted loosely in bearings $s\ s$ on the frames A' A'. This shaft carries two bent arms, T T, which each engage in one of the series of holes $x$ and lie upon the upper surface of the frames A' A', thus supporting the scrapers W.

U is a hand-lever firmly secured to the shaft S. When it is desired to raise the scrapers W, the attendant pulls upon the lever U and holds it until the obstruction is passed, when the lever U, and consequently the scrapers W, may be again lowered; or the lever U may be made to engage the hook $d$ on the seat D, thus holding the scrapers in an elevated position as long as may be required.

It will be observed that the mounting of the machinery for lifting and dogging the lever M on the forward end of the lever itself makes its gravity contribute to counterbalance the cultivator proper. It enables the operator to lift the cultivator by throwing his weight on the forward end of M without adding any weight for the purpose.

Modifications may be made in certain portions without departing from the principle or sacrificing the advantages of the invention. Parts can be used without the whole. By withdrawing the pin E and entirely disconnecting the lever M and its attachments my machine becomes a sulky, which is adapted to operate with any kind of cultivator. I prefer to use the whole, as specified.

I claim as my invention—

1. In a sulky-cultivator, the lever or center cultivator-bar, M, cross-bar M', hinged side bars, K, and links I, in combination with the sliding bar J, and the lever G and segment M², both seated upon the front end of the center bar, M, in front of its pivotal point, whereby the cultivator-frame shall be partially balanced upon the sulky by the weight of the lifting devices, substantially as shown and described.

2. In a sulky-cultivator, the foot-lever P and spring Q, in combination with the lever M, connecting with the cultivator and with the curved rack A⁷, carried on the frame, adapted to allow the cultivator to be held at different elevations, as herein specified.

3. In a sulky-cultivator, the adjustable center E, carried in the forked bracket A⁶, in combination with the cultivator and with the lever M, so as to gage the depth to which the cultivator shall act, and with provisions, as shown, for raising and lowering and widening and narrowing the cultivator while running, as herein specified.

4. In a sulky-cultivator, the tilting lever M and side frames, K K, hinged thereto, in combination with the reciprocating rod J, toggle-links I, and lever G, arranged for joint operation, as herein specified.

5. In a sulky-cultivator, the wheel-guards W, in the form of inclined lifters and spreaders, carried on arms X and arranged to lift and guide the leaves of the plants harmlessly past the wheels, as herein specified.

6. The wheel-guard scrapers W, pivoted at the center of the respective carrying-wheels C, in combination with said wheels and with the lifting-rods X', shaft S, operating-lever U, and arms T, arranged to be conveniently raised and lowered while moving, as herein specified.

In testimony whereof I have hereunto set my hand, at Kingston, Massachusetts, this 28th day of February, 1887, in the presence of two subscribing witnesses.

CALEB BATES.

Witnesses:
  CHARLOTTE G. ADAMS,
  HORATIO ADAMS.